Sept. 4, 1945.  H. SPINGLER  2,384,142
VAPOR TREATMENT DEVICE
Filed Oct. 2, 1944
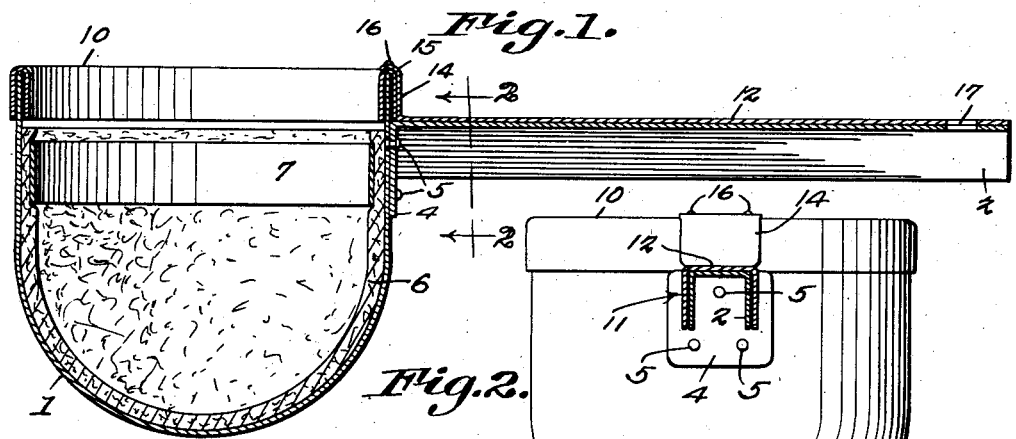
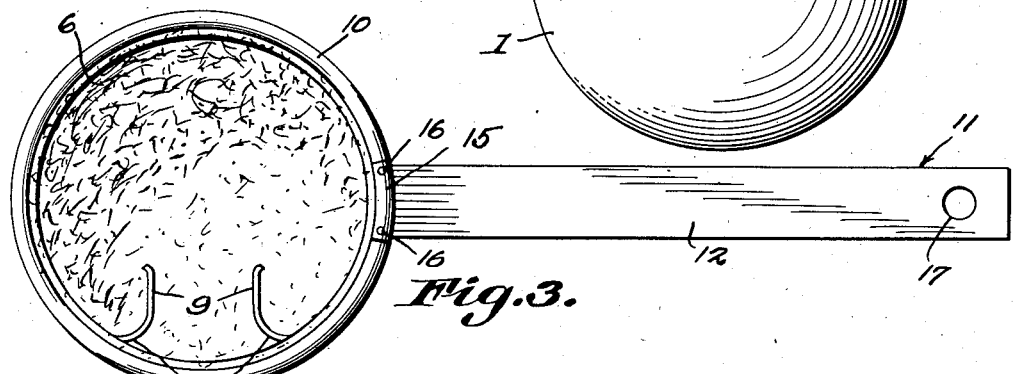
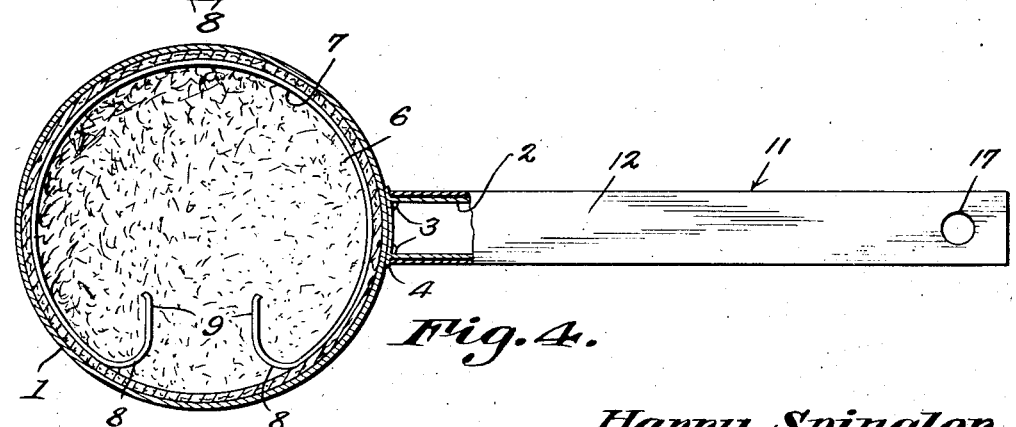
Harry Spingler
INVENTOR.
BY
ATTORNEYS.

Patented Sept. 4, 1945

2,384,142

UNITED STATES PATENT OFFICE 2,384,142

VAPOR TREATMENT DEVICE

Harry Spingler, Brooklyn, N. Y., assignor of twenty-five per cent to Richard Harry Spingler, Brooklyn, N. Y.

Application October 2, 1944, Serial No. 556,829

6 Claims. (Cl. 128—260)

This invention aims to provide a novel means whereby moist vapor may be applied to the body of a patient for the treatment of various pathological conditions.

The invention aims to provide a device of the class described which can be handled readily by an operator, the construction being such that although heated and moist vapor comes into contact with the body of the patient, there is no hot part of metal or the like to come into contact with the patient's body. The invention aims to provide novel means whereby the constituent parts of the device may be held together releasibly in operative condition.

Within the scope of what is claimed, changes in the embodiment of the invention herein disclosed may be made without departing from the spirit of the invention.

In the accompanying drawing:

Figure 1 shows in longitudinal section a device constructed in accordance with the invention.

Figure 2 is a transverse section on line 2—2 of Figure 1.

Figure 3 is a top plan.

Figure 4 is a top plan wherein parts are broken away.

The vapor treatment device forming the subject matter of this application comprises a cup-shaped body 1, which is imperforate, and made of any selected material, such as metal, if metal is available. Numeral 2 marks the handle. In the interest of lightness and strength, the handle 2 may be trough-shaped in cross section, it being disposed in outstanding relation with respect to the body 1, and it is connected to the body in any preferred way. The handle 2, if desired, may be soldered 3 to a bracket plate 4, attached by securing elements 5 to the body 1.

Within the body 1 is located an absorbent pad 6, made of any preferred material. The pad 6 may be cup-shaped, if desired. Within the pad 6 is placed a resilient, expansible holder 7, having spaced ends 8, provided with inwardly projecting fingers 9. When the fingers 9 are pressed together the hold of the part 7 on the pad 6 is released, and the pad may be removed.

The end of the body 1 is received in a guard 10, which is trough-shaped in cross section. A second handle 11 is provided and is trough-shaped in cross section, the second handle receiving the handle 2 of the body 1, and being resilient, to grip that handle frictionally but detachably. The handle 11 may be secured to the guard 10 in any preferred way. In the present embodiment of the invention, the handle 11 includes an upper wall 12, which is prolonged at one end to form a rectangularly disposed arm 14 extended along the outer surface of the guard 10, and terminating in a hook 15, which overhangs the guard. The arm 14 and the hook 15, constitute cooperating, guard-engaging elements, and one of those elements; to wit, the hook 15 is attached to the guard 10 by securing members 16. The handles 2 and 11 may be provided, near their free ends, with registering openings 17, facilitating the suspension of the device when it is not in use.

In practical operation, the guard 10 and its handle 11 are detached, respectively, from the body 1 and the handle 2. The body 1, with the pad 6 therein, is held for a short time in hot water or other liquid, until the pad is thoroughly saturated. The cup-shaped body 1 is then inverted to permit surplus liquid to drain away. The guard 10 is disposed over the edge of the body 1, the handle 2 receiving the handle 11. It is to be noted that neither the handle 11 nor the guard 10 has been heated. The guard 10 is cool when it is pressed against the face of the patient, and the handle 11 is cool to the touch of the operator. There is an advantage in making the guard 10 of trough-shape, since the flesh of the patient may enter within the guard or engage around the guard, on the outside of it. A cool surface, in any event, is presented to the face of the patient or to any other part of his body which is being treated. The device is useful, for example, in melting wax of the outer ear.

What is claimed:

1. A vapor treatment device comprising a cup-shaped body, a handle, means for securing the handle to the body in laterally outstanding relation with respect thereto, a guard which covers the edge of the body, a second handle shaped to be gripped simultaneously with the handle of the body, and means for securing the second handle to the guard in laterally outstanding relation with respect thereto.

2. A vapor treatment device constructed as set forth in claim 1, and wherein the guard is of trough-shape in cross section and receives the edge of the body.

3. A vapor treatment device constructed as set forth in claim 1, in combination with an absorbent pad in the body, and means for holding the pad removably in the body.

4. A vapor treatment device constructed as set forth in claim 1, in combination with a cup-shaped, absorbent pad in the body, a resiliently expansible holder engaging the inner surface of the pad, the holder having spaced ends, and inwardly projecting fingers on said ends.

5. A vapor treatment device constructed as set forth in claim 1, and wherein the second handle is trough-shaped and receives the handle of the body, the second handle being resilient to grip the handle of the body frictionally and detachably.

6. A vapor treatment device comprising a cup-shaped body, a trough-shaped handle disposed in outstanding relation with respect to the body and having its inner end secured to the body, a trough-shaped guard receiving the upper edge of the body, a second handle of trough-shape in cross section and receiving the handle of the body, the second handle being resilient, to grip the handle of the body frictionally and detachably, the second handle including an upper wall which is prolonged at one end to form an arm extending along the outer surface of the guard, the arm terminating in a hook overhanging the guard, the arm and the hook constituting cooperating guard engaging elements, and means for securing one of said cooperating elements to the guard.

HARRY SPINGLER.